US012663814B2

(12) United States Patent
Lazaridis et al.

(10) Patent No.:  US 12,663,814 B2
(45) Date of Patent:  Jun. 23, 2026

(54) METHOD FOR MONITORING A DRIVING MANEUVER, TEST DEVICE, COMPUTER PROGRAM AND MEDIUM

(71) Applicant: Ford Global Technologies, LLC, Dearborn, MI (US)

(72) Inventors: Elena Lazaridis, Cologne (DE); Paul Jamnicki, Bonn (DE)

( * ) Notice: Subject to any disclaimer, the term of this patent is extended or adjusted under 35 U.S.C. 154(b) by 28 days.

(21) Appl. No.: 18/781,647

(22) Filed: Jul. 23, 2024

(65) Prior Publication Data

US 2025/0036143 A1    Jan. 30, 2025

(30) Foreign Application Priority Data

Jul. 25, 2023    (DE) .......................... 102023119654.5

(51) Int. Cl.
| | |
|---|---|
| *G05D 1/689* | (2024.01) |
| *B64U 10/14* | (2023.01) |
| *B64U 101/30* | (2023.01) |
| *G05D 109/20* | (2024.01) |
| *G06T 7/73* | (2017.01) |
| *H04N 7/18* | (2006.01) |

(52) U.S. Cl.
CPC .............. *G05D 1/689* (2024.01); *G06T 7/73* (2017.01); *H04N 7/183* (2013.01); *B64U 10/14* (2023.01); *B64U 2101/30* (2023.01); *G05D 2109/20* (2024.01); *G06T 2207/10016* (2013.01); *G06T 2207/10032* (2013.01); *G06T 2207/30204* (2013.01)

(58) Field of Classification Search
CPC ...... G05D 1/689; G05D 2109/20; G06T 7/73;

G06T 2207/10016; G06T 2207/10032; G06T 2207/30204; H04N 7/183; B64U 10/14; B64U 2101/30; B60W 60/0025; B60W 50/04
See application file for complete search history.

(56) References Cited

U.S. PATENT DOCUMENTS

| | | | | |
|---|---|---|---|---|
| 11,661,003 B1 * | 5/2023 | Agarwal | ................ | B64D 47/00 |
| | | | | 701/3 |
| 2018/0203470 A1 * | 7/2018 | Pattison | ................ | B64D 47/04 |
| 2019/0051169 A1 * | 2/2019 | Gomez Gutierrez | ........................ | |
| | | | | G08G 1/0965 |

FOREIGN PATENT DOCUMENTS

| | | | | | |
|---|---|---|---|---|---|
| DE | 102018211138 A1 * | 1/2020 | ........... | G09F 21/048 |
| FR | 3017585 A1 * | 8/2015 | ............. | G08G 1/168 |
| WO | WO-2019006768 A1 * | 1/2019 | ............. | E04H 6/422 |

* cited by examiner

*Primary Examiner* — Aniss Chad
*Assistant Examiner* — Nikki Marie M Molina
(74) *Attorney, Agent, or Firm* — Emily Campbell; Eversheds Sutherland (US) LLP

(57) ABSTRACT

The invention relates to a method for monitoring a driving maneuver of a motor vehicle from a motor vehicle start position to a motor vehicle end position, comprising the steps of: a) providing the motor vehicle; b) providing a drone comprising a camera and a laser and/or the projector; c) raising the drone; f) projecting a marker onto the motor vehicle and/or onto the surroundings of the motor vehicle during the driving maneuver by means of the laser and/or the projector; g) recording a video sequence of the motor vehicle and the marker from above by means of the camera during the driving maneuver, wherein the video sequence optionally shows a nearby object. The invention also relates to a test device, a computer program and a computer-readable medium.

17 Claims, 3 Drawing Sheets

METHOD FOR MONITORING A DRIVING MANEUVER, TEST DEVICE, COMPUTER PROGRAM AND MEDIUM

CROSS-REFERENCE TO RELATED APPLICATIONS

The present application claims priority to and the benefit of German Application No. 102023119654.5, filed on Jul. 25, 2023, which is hereby incorporated by reference herein in its entirety.

FIELD

The invention relates to a method for monitoring a driving maneuver of a motor vehicle, a test device having means for carrying out the method, a computer program having commands for carrying out the method, and a computer-readable medium on which the computer program is stored.

BACKGROUND

A motor vehicle may be configured to perform driving maneuvers autonomously. The driving maneuver can be a parking operation, for example. Another example may be an automatic braking operation if a distance to a vehicle driving ahead becomes too short. It is necessary to test the autonomous driving maneuver in order to find and correct sources of error. For this purpose, a test scenario must be set up in which the motor vehicle and nearby objects, such as parked vehicles, are arranged and in which the motor vehicle performs the driving maneuver. A vehicle start position, a vehicle end position and the positions of the nearby objects must be measured out in a laborious procedure, for example by means of a measuring tape. The test scenario can also be marked with labels, such as adhesive tape and/or chalk. However, this is a disadvantage because the labels can be damaged if precipitation occurs or if they are driven over. The driving maneuver can be recorded with a camera. However, this is disadvantageous because certain situations are obscured by the motor vehicle and/or the nearby objects during the driving maneuver, so that shots taken by the camera do not show all the necessary information about the driving maneuver.

SUMMARY

The object of the invention therefore is to provide an improved method for monitoring a driving maneuver. A further object of the invention is to provide a test device, a computer program and a computer-readable medium for carrying out the method.

The method according to the invention for monitoring a driving maneuver of a motor vehicle performed from a motor vehicle start position to a motor vehicle end position comprises the steps of: a) providing the motor vehicle; b) providing a drone comprising a camera and a laser and/or a projector; c) raising the drone; f) projecting a marker onto the motor vehicle and/or onto the surroundings of the motor vehicle during the driving maneuver by means of the laser and/or the projector; g) recording a video sequence of the motor vehicle and the marker from above by means of the camera during the driving maneuver, wherein the video sequence optionally shows a nearby object.

The fact that the camera records the driving maneuver from above provides a particularly good overview with all relevant information about the driving maneuver, which creates an improved method for monitoring the driving maneuver. By projecting the marker by means of the laser and/or the projector and recording this marker by means of the camera, the driving maneuver can be measured with particularly high accuracy, for example by measuring distances between the motor vehicle and the marker, which allows the method to be further improved.

It is preferred that the driving maneuver is a driving maneuver carried out at least semi-autonomously by the motor vehicle. The driving maneuver can be a parking operation, for example. Another example of the driving maneuver is a braking operation. The driving maneuver can be one that is performed completely autonomously by the motor vehicle.

It is preferred that the method comprises the step: d) projecting a preparation marker by means of the laser and/or the projector and positioning the motor vehicle and/or the nearby object relative to the preparation marker before the driving maneuver is carried out. Thus, a test scenario in which the motor vehicle is in the motor vehicle start position and/or the nearby object or several of the nearby objects are arranged, can be set up more quickly than in a conventional method, in which the position and orientation of the motor vehicle and in particular of the nearby object or the nearby objects are laboriously measured out, in particular by means of a measuring tape.

The method preferably comprises the step: e) transmitting vehicle data from the motor vehicle to the drone. This makes it advantageously possible to make the vehicle data visible by means of the marker.

The motor vehicle data preferably comprises data on a route planned by the motor vehicle, which is to be traveled by the motor vehicle during the driving maneuver, and the marker displayed in step f) indicates the planned route. This makes it possible to detect deviations of the planned route from a route actually traveled by the motor vehicle during the driving maneuver particularly quickly and easily and with a high degree of accuracy.

It is preferable that the motor vehicle data comprises data on a motor vehicle position planned by the motor vehicle, which is to be adopted by the motor vehicle during the driving maneuver, and that the marker displayed in step f) indicates the planned motor vehicle position. This makes it possible to detect deviations of the planned motor vehicle position from a motor vehicle position actually adopted by the motor vehicle during the driving maneuver particularly quickly and easily and with a high degree of accuracy. The motor vehicle data may also include data on a plurality of the planned motor vehicle positions at different time points, wherein in step f) the motor vehicle positions at the different time points are displayed.

It is preferable that the motor vehicle data comprises data on a motor vehicle orientation planned by the motor vehicle, which is to be adopted by the motor vehicle during the driving maneuver, and that the marker displayed in step f) indicates the planned motor vehicle position. This makes it possible to detect deviations of the planned motor vehicle orientation from a motor vehicle orientation actually adopted by the motor vehicle during the driving maneuver particularly quickly and easily and with a high degree of accuracy. The motor vehicle data may also include data on a plurality of the planned motor vehicle orientations at different time points, wherein in step f) the motor vehicle orientations at the different time points are displayed.

It is preferred that the motor vehicle data comprises data about a position of the nearby object, which is detected by the motor vehicle during the driving maneuver, and the marker displayed in step f) indicates the position of the nearby object. This makes it particularly quick and simple to check how reliably sensors deployed in the motor vehicle detect the position of the nearby object.

It is preferred that the motor vehicle data comprise data about a ground surface that is detected by the motor vehicle, wherein the marker 10 displayed in step f) indicates the data about the ground surface 13. For example, the data on the ground surface 13 may include the position of a curb.

The drone is preferably moved to a predetermined drone position in step c) before the driving maneuver. The predetermined drone position is preferably arranged above the motor vehicle start position, above a planned motor vehicle start position or above a planned motor vehicle end position. It is conceivable that the predetermined drone position is determined by means of a position of the environment object which is detected by the camera, and/or by means of an identifier, different from the marker, which is detected by the camera.

It is preferred that the drone is repositioned together with the motor vehicle during the driving maneuver, so that the drone is arranged above the motor vehicle during the driving maneuver and in particular during the entire driving maneuver. This results in a particularly good overview with all relevant information about the driving maneuver. The position of the motor vehicle, by means of which the drone changes position together with the motor vehicle, can be taken, for example, from one or more images captured by the camera or may be included in the motor vehicle data transmitted in step e).

The test device according to the invention has means which are configured to carry out the method according to the invention or a preferred embodiment of the method according to the invention. The means could include, for example, the motor vehicle and the drone.

The test device preferably has a control unit which is configured to control the drone. The control unit can be arranged spaced apart from the drone and be configured to communicate wirelessly with the drone. The control unit can be a computer having computer hardware and/or software, for example. In addition, the test device may have a screen which is configured to display the video sequence and/or individual frames of the video sequence.

The computer program according to the invention has commands that cause the test device according to the invention or a preferred embodiment of the test device to carry out the method steps of the method according to the invention or of a preferred embodiment of the method. The computer program may have information about a test scenario or multiple different test scenarios, so that the computer program can monitor the one or more different test scenarios.

The computer program is stored on the computer-readable medium according to the invention.

BRIEF DESCRIPTION OF THE DRAWINGS

The present invention is explained in more detail in the following with the aid of the accompanying schematic drawings. In the drawings.

DETAILED DESCRIPTION

Figure 1:
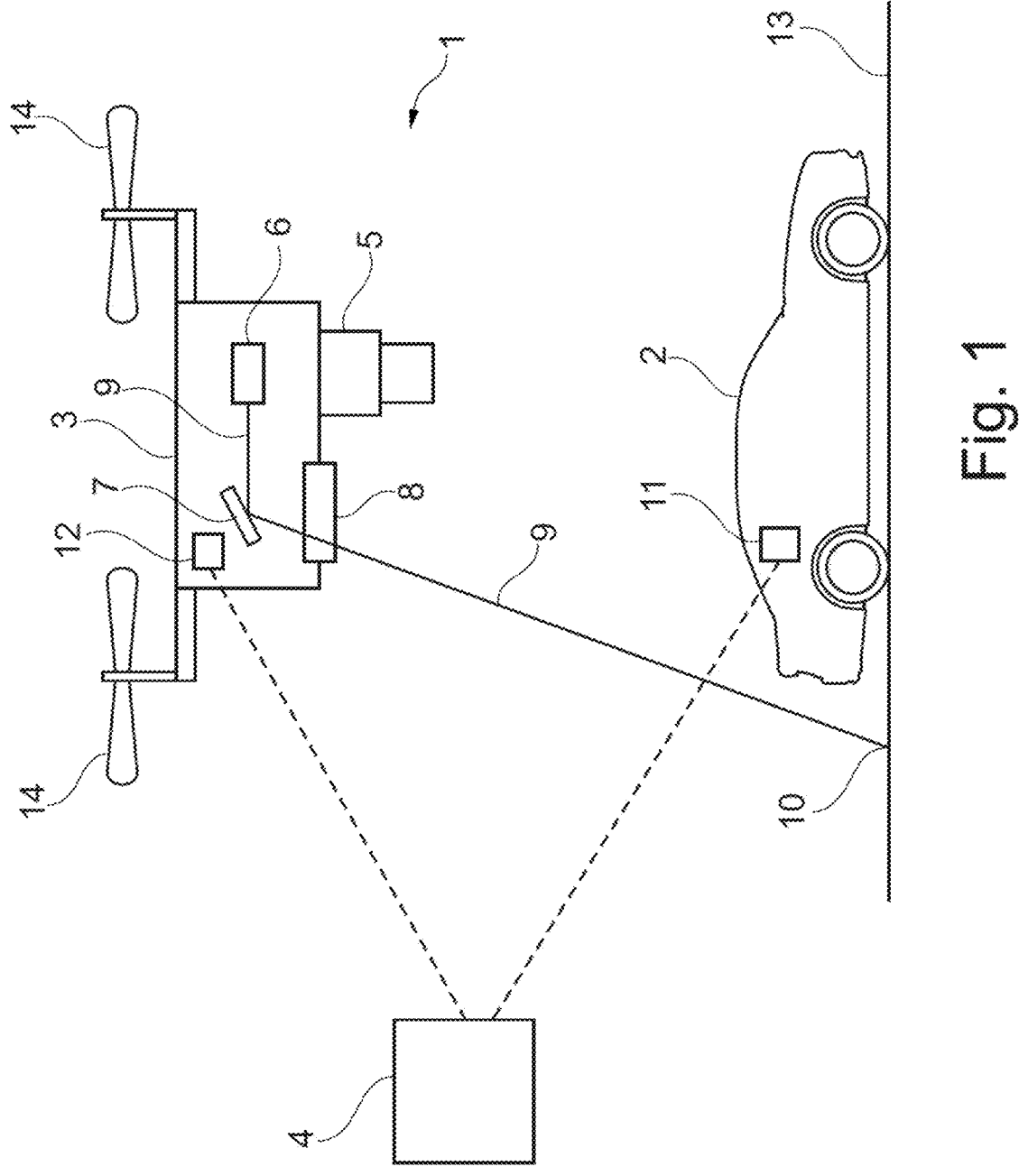
FIG. 1 shows a test device according to the invention.
Figure 2:
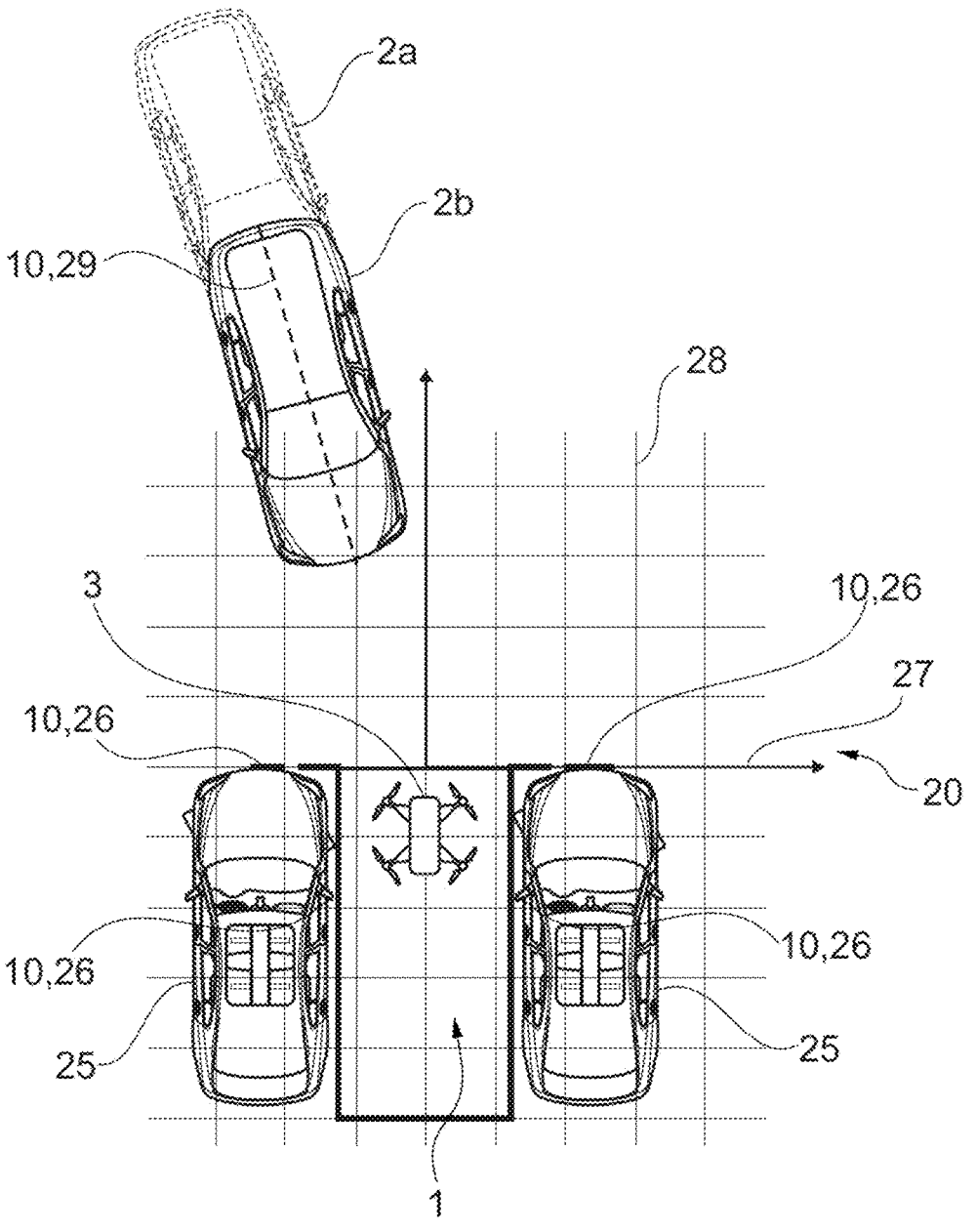
FIG. 2 shows a test scenario at a first time point and a second time point.
Figure 3:
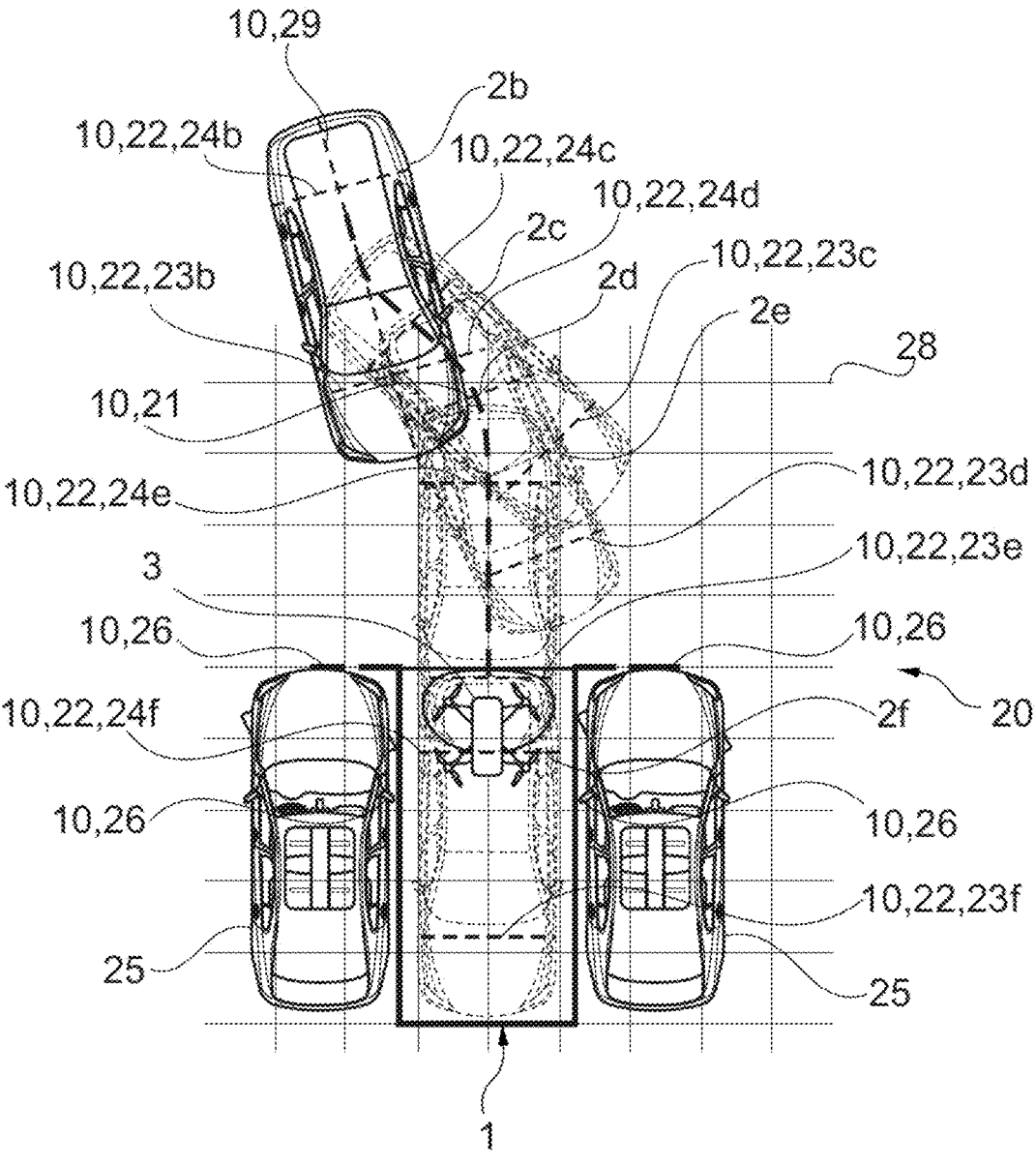
FIG. 3 shows the test scenario at the second time point up to a sixth time point.

FIGS. 1 to 3 show a test device 1 according to the invention, comprising means which are configured to carry out a method according to the invention for monitoring a driving maneuver of a motor vehicle 2 performed from a motor vehicle start position to a motor vehicle end position, the method comprising the steps of: a) providing the motor vehicle 2; b) providing a drone 3 comprising a camera 5 and a laser 6 and/or a projector; c) raising the drone 3; f) projecting a marker 10 onto the motor vehicle and/or onto the surroundings of the motor vehicle 2 during the driving maneuver by means of the laser 6 and/or the projector; g) recording a video sequence of the motor vehicle 2 and the marker 10 from above by means of the camera 5 during the driving maneuver, wherein the video sequence optionally shows a nearby object 25.

The video sequence shows the motor vehicle 2 at least in the motor vehicle start position and in the motor vehicle end position, wherein the video sequence can also show the motor vehicle 2 in positions between the motor vehicle start position and the motor vehicle end position.

The driving maneuver may be a driving maneuver carried out at least partially autonomously by the motor vehicle 2 or a driving maneuver carried out completely autonomously by the motor vehicle 2. For example, the driving maneuver can be a parking operation and/or a braking operation.

It is conceivable that the laser is configured to emit laser radiation in the visible wavelength range and/or in the infrared wavelength range. It is conceivable that the projector does not have a laser.

FIG. 1 shows that the drone 3 can have at least one propeller 14, by means of which the drone 3 can be raised. In addition, the drone 3 can have a mirror 7, which is pivotably arranged, in particular pivotably about two different axes, which can be arranged perpendicular to each other, for example. The laser 6 may be configured to direct a laser beam 9 onto the mirror 7 and the mirror 7 may be configured to deflect the laser beam 9. The mirror 7 being arranged pivotably about the two axes means that, by changing the orientation of the mirror 7 by pivoting it about one or both of the axes, the laser beam 9 can be directed onto different points of the motor vehicle 2 and/or the surroundings of the motor vehicle 2. At the point at which the laser beam 9 strikes a surface, the marker 10 is created in step f). It is conceivable that the laser 6 and the mirror 7 are arranged within the drone 3. The drone 3 may also have a window 8 via which the laser beam 9 exits the drone 3 after the laser beam 9 has been deflected by the mirror 7.

It is conceivable that the drone 3 has a plurality of lasers 6 and/or a plurality of projectors, wherein in particular for each of the lasers 6 a respective mirror 7 is provided. It is also conceivable that the drone 3 has a plurality of cameras 5.

FIG. 2 shows that the method may comprise the step: d) projecting a preparation marker 29 by means of the laser 6 and/or the projector and positioning the motor vehicle 25 relative to the preparation marker 29 before the driving maneuver is carried out. FIG. 2 shows the motor vehicle 2 at a first time point 2a and at a time point 2b, wherein the motor vehicle 2 has been moved starting from the first time point 2a such that at the second time point 2b, the preparation marker 29, which in FIG. 2 is a line which may be dashed, coincides with the x-axis of the motor vehicle 2 when viewed from above. In addition to or alternatively to the positioning of the motor vehicle 2 relative to the preparation marker 29, it is conceivable that in step d) the nearby object 25 or a plurality of the nearby objects 25 is or are arranged relative to the preparation marker 29 before the driving maneuver is carried out. By carrying out step d), a test scenario 20 can be created in which the motor vehicle 2 is positioned in the motor vehicle start position, wherein in FIG. 2 the motor vehicle start position occurs at the second time point 2b.

The method can comprise the step: e) transmitting vehicle data from the motor vehicle 2 to the drone 3. As can be seen from FIG. 1, the motor vehicle 2 may have a motor vehicle communication unit 11, which in particular has a transmitter, and the drone 3 may have a drone communication unit 12, which in particular has a receiver. The motor vehicle communication unit 11 and the drone communication unit 12 may be configured to transmit the motor vehicle data in step e) wirelessly. It is conceivable that the motor vehicle communication unit 11 transmits the motor vehicle data directly to the drone communication unit 12. Alternatively, it is conceivable that, as shown in FIG. 1, the test device 1 has a control unit 4, which can have a transmitter and a receiver and is spaced apart from the drone 3 and in particular spaced apart from the motor vehicle 2, wherein the control unit 4 receives the motor vehicle data from the motor vehicle communication unit 11 and sends it to the drone communication unit 12. The control unit 4 can also be configured to control the drone 3. The drone communication unit 12 can have a transmitter and can send the video sequence to the control unit 4 by means of the transmitter, and the control unit 4 can have a screen which is configured to display the video sequence.

FIG. 3 shows that the motor vehicle data comprises data on a route 21 planned by the motor vehicle 2, which is to be traveled by the motor vehicle 2 during the driving maneuver, and the marker 10 displayed in step f) indicates the planned route 21. In the video sequence, deviations of the planned route 21 from the route actually traveled by the motor vehicle during the driving maneuver can be particularly easily identified and evaluated. In particular, the control unit 4 can be configured to identify and evaluate the deviations. The planned route 21 shown in FIG. 3 may refer to a specific point of the motor vehicle 2, wherein it is conceivable that the specific point is marked on top of the motor vehicle 2, for example by means of color and/or by means of an adhesive strip. This makes it particularly simple to detect deviations between the specific point and the planned route 21 indicated by the marker 10.

It is apparent from FIG. 3 that the motor vehicle data can comprise data on a motor vehicle position 22 planned by the motor vehicle 2, which is to be adopted by the motor vehicle 2 during the driving maneuver, and the marker 10 displayed in step f) indicates the planned motor vehicle position 22. In addition, the motor vehicle data may include data on a motor vehicle orientation planned by the motor vehicle 2, which is to be adopted by the motor vehicle 2 during the driving maneuver, and the marker 10 displayed in step f) indicates the planned motor vehicle orientation. In the video sequence, deviations of the planned motor vehicle position and/or the planned motor vehicle orientation from the motor vehicle position and/or motor vehicle orientation actually adopted by the vehicle during the driving maneuver can be particularly easily identified and evaluated. In particular, the control unit 4 can be configured to identify and evaluate the deviations. It is conceivable that a plurality of the planned motor vehicle positions 22 and the planned motor vehicle orientations are displayed, which correspond to different time points during the driving maneuver. In FIG. 3, the marker 10 has a front marker 23b to 23f extending from one lateral end to another lateral end of the motor vehicle 2 in the planned motor vehicle position 22 and planned motor vehicle orientation thereof, and a rear marker 24b to 24f, arranged spaced apart from the front marker 23b to 23f and extending from one lateral end to the other lateral end of the motor vehicle 2 in the planned motor vehicle position 22 and planned motor vehicle orientation thereof. The front markers 23b to 23f and the rear markers 24b to 24f indicate the planned motor vehicle position 22 and the planned motor vehicle orientation.

In FIG. 3, the motor vehicle 2 is shown at the second time point 2b, a third time point 2c, a fourth time point 2d, a fifth time point 2e and a sixth time point 2f, wherein the time advances continuously from the second time point 2b to the sixth time point 2f. The second time point 2b corresponds to the motor vehicle starting position and the sixth time point 2f corresponds to the motor vehicle end position. At the second time point 2b, the front marker 23b and the rear marker 24b are projected, at the third time point 2c the front marker 23c and the rear marker 24c are projected, at the fourth time point 2d the front marker 23d and the rear marker 24d are projected, at the fifth time point 2e the front marker 23e and the rear marker 24e are projected, and at the sixth time point 2f, the front marker 23f and the rear marker 24f are projected.

As is apparent from FIGS. 2 and 3, the motor vehicle data can comprise data on a position 26 of the nearby object 25, which is detected by the motor vehicle 2 during the driving maneuver, and the marker 10 displayed in step f) indicates the position 26 of the nearby object 25. In the case that the nearby object 25 is another motor vehicle, the position 26 may be the outer end of an external mirror of the other motor vehicle and/or the front and/or rear of the motor vehicle, compare FIGS. 2 and 3. The motor vehicle data may also include data on the position of more than one of the nearby objects 25.

It is also conceivable that the motor vehicle data comprises data about a ground surface 13 that is detected by the motor vehicle 2, wherein the marker 10 displayed in step f) indicates the data about the ground surface 13. For example, the data on the ground surface 13 may include the position of a curb.

It is conceivable that in step c) the drone 3 is moved to a predetermined drone position before the driving maneuver. The predetermined drone position may be arranged, for example, above the motor vehicle start position, above a planned motor vehicle start position or above a planned motor vehicle end position, the last option being shown in FIGS. 2 and 3. The predetermined drone position can be determined by means of a position 26 of the nearby object 25 and/or of a plurality of the nearby objects, which is detected by the camera 5, and/or by means of an identifier, different from the marker 10, which is detected by the camera 5. It is also conceivable that the drone 3 is repositioned together with the motor vehicle 2 during the driving maneuver, so that the drone 3 is arranged above the motor vehicle 2 during the driving maneuver, in particular during the entire driving maneuver.

FIGS. 2 and 3 show that the laser 6 and/or the projector can project a grid 28 during the driving maneuver. Using the grid 28, the driving maneuver can be measured in the video sequence particularly simply. It is also conceivable that the laser 6 and/or the projector project a coordinate system 27 during the driving maneuver, compare FIG. 2.

By means of the method, the adaptation of a piece of software for the at least partially autonomously performed driving maneuver can be carried out particularly quickly.

LIST OF REFERENCE SIGNS 1 test device
2 motor vehicle

2*a* motor vehicle at first time point
2*b* motor vehicle at second time point
2*c* motor vehicle at third time point
2*d* motor vehicle at fourth time point
2*e* motor vehicle at fifth time point
2*f* motor vehicle at sixth time point
3 drone
4 control unit
5 camera
6 laser
7 mirror
8 window
9 laser beam
10 marker
11 motor vehicle communication unit
12 drone communication unit
13 ground surface
14 propeller
20 test scenario
21 planned route
22 planned motor vehicle position
23*b* front marker at second time point
23*c* front marker at third time point
23*d* front marker at fourth time point
23*e* front marker at fifth time point
23*f* front marker at sixth time point
24*b* rear marker at second time point
24*c* rear marker at third time point
24*d* rear marker at fourth time point
24*e* rear marker at fifth time point
24*f* rear marker at sixth time point
25 nearby object
26 position of the nearby object
27 coordinate system
28 grid
29 preparation marker
The invention claimed is:

1. A method for monitoring a driving maneuver of a motor vehicle performed from a motor vehicle start position to a motor vehicle end position, comprising the steps of:
   providing a drone comprising a camera and at least one of a laser or a projector;
   raising the drone;
   projecting a marker onto at least one of the motor vehicle or onto a surroundings of the motor vehicle during the driving maneuver using at least one of the laser or the projector; and
   recording a video sequence of the motor vehicle and the marker from above by the camera during the driving maneuver, wherein the video sequence shows a nearby object, and wherein the marker provides a visual reference for the driving maneuver in the recorded video sequence;
   transmitting motor vehicle data from the motor vehicle to the drone, wherein the transmitted motor vehicle data comprises data on a route planned by the motor vehicle, which is to be traveled by the motor vehicle during the driving maneuver, and the marker indicates the planned route.

2. The method according to claim 1, wherein the driving maneuver is a driving maneuver carried out at least partially autonomously by the motor vehicle.

3. The method according to claim 1, further comprising the steps of:
   projecting a preparation marker by using at least one of the laser or the projector before the driving maneuver is carried out.

4. The method according to claim 1, wherein the motor vehicle data comprises data on a motor vehicle position planned by the motor vehicle, which is to be adopted by the motor vehicle during the driving maneuver, and the marker indicates the planned motor vehicle position.

5. The method according to claim 1, wherein the motor vehicle data comprises data on a motor vehicle orientation planned by the motor vehicle, which is to be adopted by the motor vehicle during the driving maneuver, and the marker indicates the planned motor vehicle orientation.

6. The method according to claim 1, wherein the motor vehicle data comprises data on a position of the nearby object, which is detected by the motor vehicle during the driving maneuver, and the marker indicates the position of the nearby object.

7. The method according to claim 1, further comprising the step of:
   moving the drone to a predetermined drone position before the driving maneuver.

8. The method according to claim 7, wherein the predetermined drone position is arranged above the motor vehicle start position, above a planned motor vehicle start position or above a planned motor vehicle end position.

9. The method according to claim 7, wherein the predetermined drone position is determined by a position of the nearby object that is detected by the camera, or by an identifier, different from the marker, that is detected by the camera.

10. The method according to claim 1, wherein the drone is repositioned together with the motor vehicle during the driving maneuver so the drone is arranged above the motor vehicle during the driving maneuver.

11. A drone for monitoring a driving maneuver of a motor vehicle performed from a motor vehicle start position to a motor vehicle end position, comprising:
   a camera;
   at least one of a laser or a projector; and
   a computer that performs the steps of:
   raise the drone;
   receiving motor vehicle data from the motor vehicle, wherein the motor vehicle data comprises data on a route planned by the motor vehicle, which is to be traveled by the motor vehicle during the driving maneuver;
   project a marker onto at least one of the motor vehicle or onto a surroundings of the motor vehicle during the driving maneuver using at least one of the laser or the projector, wherein the marker indicates the planned route; and
   record a video sequence of the motor vehicle and the marker from above by the camera during the driving maneuver, wherein the video sequence shows a nearby object, and wherein the marker provides a visual reference for the driving maneuver in the recorded video sequence.

12. The drone of claim 11, wherein the driving maneuver is a driving maneuver carried out at least partially autonomously by the motor vehicle.

13. The drone of claim 11, wherein the computer further performs the steps of:
   projecting a preparation marker by using at least one of the laser or the projector before the driving maneuver is carried out.

14. The drone of claim 11, wherein the motor vehicle data comprises data on a position of the nearby object, which is detected by the motor vehicle during the driving maneuver, and the marker indicates the position of the nearby object.

15. The drone of claim 11, wherein the computer further performs the steps of:

moving the drone to a predetermined drone position before the driving maneuver.

16. The drone of claim 15, wherein the predetermined drone position is arranged above the motor vehicle start position, above a planned motor vehicle start position or above a planned motor vehicle end position.

17. The drone of claim 15, wherein the predetermined drone position is determined by a position of the nearby object that is detected by the camera, or by an identifier, different from the marker, that is detected by the camera.

\* \* \* \* \*